UNITED STATES PATENT OFFICE.

HAROLD ALLMAN LEWIS AND FREDERICK GLYN PRICE, OF COBALT, ONTARIO, CANADA; SAID PRICE ASSIGNOR TO SAID LEWIS, OF ORURO, BOLIVIA.

EXTRACTION OF ARSENIC OR ANTIMONY FROM ORES CONTAINING THE SAME.

1,104,810.  Specification of Letters Patent.  Patented July 28, 1914.

No Drawing.  Application filed March 8, 1912. Serial No. 682,543.

*To all whom it may concern:*

Be it known that we, HAROLD ALLMAN LEWIS and FREDERICK GLYN PRICE, subjects of the King of England, both residing at Cobalt, in the Province of Ontario, Canada, have invented certain new and useful Improvements in the Extraction of Arsenic or Antimony from Ores Containing the Same, of which the following is a specification.

In many ores, such for example as ores found in the cobalt district of Ontario arsenic and antimony are found in combination with cobalt, nickel, copper, silver, iron and other metals and an important step in the treatment of such ores is the removal of the arsenic.

According to this invention, which is an improvement on the process described in our Canadian Patent No. 137154 dated December, 1911, the ore or other product containing cobalt, nickel, copper, silver, iron and other metals, as well as arsenic or antimony or both is finely ground and intimately mixed with suitable proportions of sulfur and of an alkali metal sulfid or the sulfid of an alkali earth such as sodium sulfid and calcium sulfid or a mixture of sulfur with an alkali metal sulfid and alkali earth sulfid.

To ascertain the exact quantities of these materials to be employed, it is necessary to know the composition of the ore. This information enables one first to calculate the quantity of sulfur sufficient to insure that those metals which are not already present as sulfids will assume that form; and secondly to calculate the quantity of alkali metal sulfid or alkali earth sulfid that it will be necessary to add to insure the arsenic and antimony being converted into double sulfids with the alkali metal or alkali earth sulfids, which are soluble in water and can therefore be extracted by leaching for example in water, preferably hot.

The proportion of sulfur required in the case of arsenious oxid may be represented by the equation:

$$2(As_2O_3) + 9S = 2(As_2S_3) + 3(SO_2)$$

The proportion of alkali metal sulfid required to convert arsenious and antimonious sulfids into soluble double sulfids will be indicated by the following equations:

(1) $Na_2S + As_2S_3 = Na_2As_2S_4$;
(2) $Na_2S + Sb_2S_3 = Na_2Sb_2S_4$.

The mixture prepared as above described is heated at a low temperature, care being taken that no oxidization or volatilization takes place. While heating is taking place the mass should be well stirred and will be found to assume a pasty form. On completion of the reaction the mass is removed from the furnace, cooled, powdered and leached in water. While the exact nature of the soluble salts produced in the reaction will vary somewhat depending on whether any excess of sulfur be employed, a typical reaction illustrating the process when some excess of sulfur is present may be represented by the following equation:

$$As_2S_3 + S_2 + Na_2S = Na_2As_2S_6.$$

If there is no excess of sulfur instead of sulfarsenates produced according to the above equation, sulfarsenites will probably be produced represented by the formula $Na_2As_2S_4$. The sulfarsenites, sulfarsenates, sulfantimonites and sulfantimonates of the alkali and alkali earth metals may contain varying proportions of alkali and alkali earth sulfids; for example in the case of sodium sulfaresnites, three types of soluble compounds may be produced, viz.

(a) $Na_2S, As_2S_3$
(b) $2Na_2S, As_2S_3$
(c) $3Na_2S, As_2S_3$, according to the amount of excess alkali sulfid employed to react with the arsenious sulfid, etc.

According to one modification of this invention the suitable proportion of sulfur is first mixed with the finely powdered ore and heated under the conditions previously specified until it assumes a pasty form, then it is allowed to cool, powdered and the requisite amount of either alkali metal sulfid or alkali earth sulfid is intimately mixed therewith and the mixture reheated until reaction takes place, resulting in the formation with the arsenic or antimony of double sulfids with the alkali metal sulfid or alkali earth sulfid which are soluble in water and can be extracted by leaching as before.

If it is found that the residue after treatment by the above process still contains more arsenic than is desired, it may be dried and retreated in a similar manner.

As an example of our process a finely powdered ore of the following composition—

| | |
|---|---|
| Arsenic | 40.7% |
| Lime | 9.5% |
| Iron | 15.7% |
| Carbon dioxid | 7.4% |
| Silver | 5.5% |
| Cobalt | 6.7% |
| Nickel | 1.7% |
| Undetermined | 12.8% | was mixed with 50% sulfur and 60% crystallized sodium sulfid ($Na_2S10OH_2O$) which is equivalent to about 30% $Na_2S$ anhydrous and heated at a low temperature in a non-oxidizing atmosphere as previously described and double sulfids of sodium and arsenic leached out. The residue therefrom was then found to contain but 9.5% of arsenic.

As another example the same ore was treated as follows:—It was intimately mixed with 40% sulfur and then heated at a low temperature and stirred forming a pasty mass which was then cooled, powdered and intimately mixed with calcium sulfid of an amount equal to 16% of the weight of the ore originally taken. This mixture was heated at a low temperature in a non-oxidizing atmosphere to complete the reaction after which it was cooled, powdered and leached. The residue therefrom was found to contain but 12.5% of arsenic.

It is within this invention to alter the proportions of the various ingredients according to the nature of the ore and the results obtained.

It is also within this invention to substitute a mixture of sulfur and quicklime for the calcium sulfid above referred to but hitherto we have found it more convenient to add the calcium sulfid in that form.

It must be stated that the term "alkaline element" in the claims is to be taken as including the alkaline metals and metals of the alkaline earths.

What we claim as our invention and desire to secure by Letters Patent is:—

1. A process for use in the removal of arsenic or antimony from ores or products containing the same consisting in mixing with the ore sulfur and a sulfid of an alkaline element and in heating the mixture until reaction takes place.

2. A process for use in the removal of arsenic or antimony from ores or products containing the same consisting in mixing with the ore sulfur and a sulfid of an alkaline element and in heating the mixture until reaction takes place, and then leaching the product of the reaction.

3. A process for use in the removal of arsenic or antimony from ores or products containing the same consisting in heating the ore with sulfur and with a sulfid of an alkaline element.

In testimony whereof we have signed our names to this specification in the presence of two subscribing witnesses.

HAROLD ALLMAN LEWIS.
FREDERICK GLYN PRICE.

Witnesses as to Harold Allman Lewis:
 H. D. JAMESON,
 C. P. LIDDON.

Witnesses as to Frederick Glyn Price:
 D. A. CLARK,
 J. JEFFREY.